(12) United States Patent
Watanabe (10) Patent No.: US 9,019,156 B2
(45) Date of Patent: Apr. 28, 2015

(54) POSITIONING APPARATUS, POSITIONING METHOD AND STORAGE MEDIUM

(75) Inventor: Kouhei Watanabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 443 days.

(21) Appl. No.: 13/615,363

(22) Filed: Sep. 13, 2012

(65) Prior Publication Data

US 2013/0082871 A1    Apr. 4, 2013

(30) Foreign Application Priority Data

Sep. 30, 2011 (JP) ................. 2011-215935

(51) Int. Cl.
*G01S 19/48* (2010.01)
(52) U.S. Cl.
CPC ...................... *G01S 19/48* (2013.01)
(58) Field of Classification Search
CPC ......... G01S 19/48; G01S 19/49; G01S 19/45; G01S 19/47
USPC ................ 342/357.31, 357.32, 357.28, 357.3
See application file for complete search history.

(56) References Cited

U.S. PATENT DOCUMENTS

| | | | |
|---|---|---|---|
| 5,491,486 A * | 2/1996 | Welles et al. ............ | 342/357.74 |
| 2007/0010940 A1 * | 1/2007 | Tan et al. ...................... | 701/207 |
| 2007/0260397 A1 | 11/2007 | Kurata | |
| 2010/0017115 A1 * | 1/2010 | Gautama ........................ | 701/202 |
| 2012/0022780 A1 * | 1/2012 | Kulik et al. ..................... | 701/220 |
| 2013/0041291 A1 * | 2/2013 | Soubeyrat et al. ............. | 600/595 |

FOREIGN PATENT DOCUMENTS

JP    2006-177772 A    7/2006

OTHER PUBLICATIONS

Chinese Office Action dated Sep. 29, 2014, issued in counterpart Chinese Application No. 201210363967.7.
Xiaolong, et al., "Study on Integrated Navigation System during GPS Failure", Aeronautic Control and Engineering Department, Aviation University of Air Force, Changchun, Jilin, 130000.
Chinese Office Action dated Jan. 22, 2014 (and English translation thereof) in counterpart Chinese Application No. 201210363967.7.

* cited by examiner

*Primary Examiner* — Harry Liu
(74) *Attorney, Agent, or Firm* — Holtz, Holtz, Goodman & Chick PC (57) ABSTRACT

A positioning apparatus, positioning method and storage medium are described. According to one implementation, a positioning apparatus includes a first positioning section, a second positioning section, a first calculating section, a control section and a specifying section. The first positioning section performs positioning of the positioning apparatus. The second positioning section performs positioning of displacement of the positioning apparatus. The first calculating section calculates a positioning accuracy of displacement. The control section controls measurement operation of the first and the second positioning sections based on the positioning accuracy calculated by the first calculating section. The specifying section specifies a present position of the positioning apparatus based on a measured result of the first and second positioning sections.

8 Claims, 6 Drawing Sheets

POSITIONING APPARATUS, POSITIONING METHOD AND STORAGE MEDIUM

BACKGROUND OF THE INVENTION

1. Field of the Invention

The present invention relates to a positioning apparatus, positioning method and storage medium.

2. Description of the Related Art

Japanese Patent Application Laid-Open Publication No. 2006-177772 describes a positioning apparatus which performs positioning using radio waves from a Global Positioning System (GPS) satellite and which also uses various positioning sensors as secondary tools in order to autonomously perform positioning when radio waves from the GPS satellite cannot be received.

According to the technique described in Japanese Patent Application Laid-Open Publication No. 2006-177772, the accuracy of the positioning data by the GPS can be judged by values such as a GST value, a C/N value, a DOP value, an EPE value and the like. Turning to the autonomous positioning, a positioning error (for example, 5%) is uniformly applied to calculate the error amount of accuracy of positioning. However, the accuracy greatly differs according to the state of holding the apparatus. Therefore, the present position may not be specified accurately by a uniform positioning error.

SUMMARY OF THE INVENTION

The present invention has been made in consideration of the above situation, and one of the main objects is to provide a positioning apparatus, positioning method and storage medium which can prevent reduction of accuracy when specifying the present position while employing different positioning methods.

In order to achieve any one of the above advantages, according to an aspect of the present invention, there is provided a positioning apparatus including:

a first positioning section which receives a signal transmitted from a positioning satellite and performs positioning of a position of the positioning apparatus;

a second positioning section which detects a movement and traveling azimuth of the positioning apparatus and performs positioning of displacement of the positioning apparatus based on the detected result;

a first calculating section which calculates a positioning accuracy of displacement of the positioning apparatus based on the movement detected by the second positioning section;

a control section which controls a measurement operation of the first positioning section and the second positioning section based on the positioning accuracy calculated by the first calculating section; and a specifying section which specifies a present position of the positioning apparatus based on a measured result by the measurement operation of the first positioning section and the second positioning section controlled by the control section.

According to an aspect of the present invention, there is provided a positioning method using a positioning apparatus including the steps of:

a first positioning process which receives a signal transmitted from a positioning satellite and performs positioning of a position of the positioning apparatus;

a second positioning process which detects a movement and traveling azimuth of the positioning apparatus and performs positioning of displacement of the positioning apparatus based on the detected result;

a first calculating process which calculates a positioning accuracy of displacement of the positioning apparatus based on the movement detected by the second positioning process;

a control process which controls a measurement operation of the first positioning process and the second positioning process based on the positioning accuracy calculated by the first calculating process; and a specifying process which specifies a present position of the positioning apparatus based on a measured result by the measurement operation of the first positioning process and the second positioning process controlled by the control process.

According to an aspect of the present invention, there is provided a non-transitory computer-readable storage medium having a program stored thereon for controlling a computer of the positioning apparatus to function as:

a first positioning section which receives a signal transmitted from a positioning satellite and performs positioning of a position of the positioning apparatus;

a second positioning section which detects a movement and traveling azimuth of the positioning apparatus and performs positioning of displacement of the positioning apparatus based on the detected result;

a first calculating section which calculates a positioning accuracy of displacement of the positioning apparatus based on the movement detected by the second positioning section;

a control section which controls a measurement operation of the first positioning section and the second positioning section based on the positioning accuracy calculated by the first calculating section; and a specifying section which specifies a present position of the positioning apparatus based on a measured result by the measurement operation of the first positioning section and the second positioning section controlled by the control section.

BRIEF DESCRIPTION OF THE DRAWINGS

The present invention and the above-described objects, features and advantages thereof will become more fully understood from the following detailed description with the accompanying drawings and wherein.

DETAILED DESCRIPTION OF THE PREFERRED EMBODIMENT

Preferred embodiments for carrying out the present invention are described in detail with reference to the attached drawings.

However, the scope of the invention is not limited to the embodiments and the illustrated examples.

The positioning apparatus 100 of the present embodiment, is an apparatus which is held by the user and which employs positioning by both GPS (GPS positioning) and positioning using an autonomous navigation sensor (autonomous navigation positioning) to sequentially record a string of position data showing a route of movement by the user.

Figure 1:
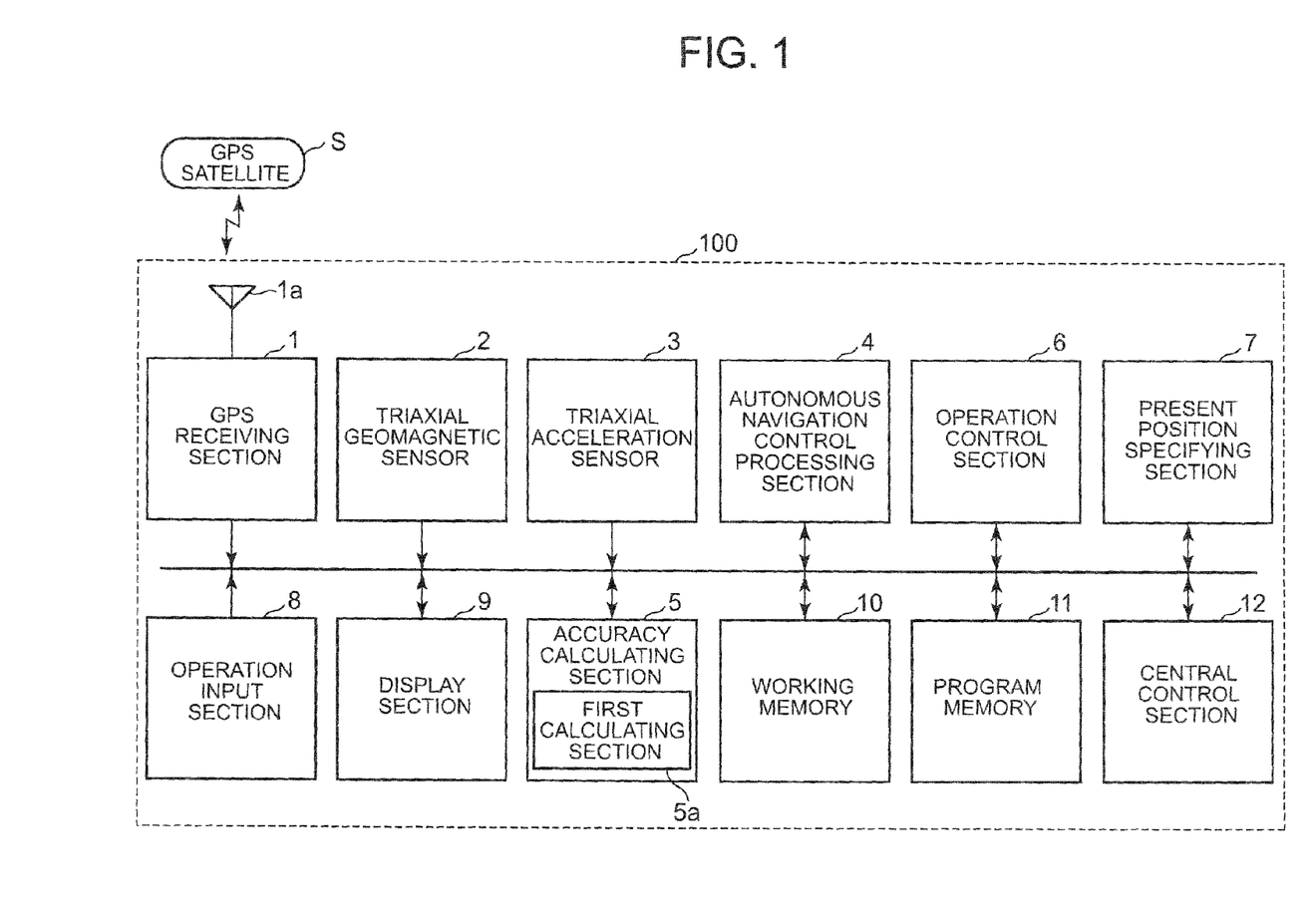
FIG. 1 is a block diagram showing a schematic configuration of a positioning apparatus of an embodiment employing the present invention.

FIG. 1 is a block diagram showing a schematic configuration of the positioning apparatus 100 of an embodiment employing the present invention.

Specifically, as shown in FIG. 1, the positioning apparatus 100 includes, a GPS receiving section 1, a triaxial geomagnetic sensor 2, a triaxial acceleration sensor 3, an autonomous navigation control processing section 4, an accuracy calculating section 5, an operation control section 6, a present position specifying section 7, an operation input section 8, a display section 9, a working memory 10, a program memory 11 and a central control section 12.

The GPS receiving section 1 receives data transmitted from the GPS (Global Positioning System) satellite S through a receiving antenna 1a.

In other words, the receiving antenna 1a receives a GPS signal (for example, almanac, ephemeris, etc.) transmitted from a plurality of GPS satellites S (positioning satellite; only one shown in FIG. 1) launched to a low Earth orbit at a predetermined timing, and outputs the GPS signal to the GPS receiving section 1.

The GPS receiving section 1 performs demodulating processing of the GPS signal received through the receiving antenna 1a to obtain various pieces of transmitted data of the GPS satellite S.

The GPS receiving section 1 performs predetermined positioning calculating based on the obtained transmitted data. With this, the GPS receiving section 1 performs the positioning of the two dimensional present position (latitude, longitude) of the positioning apparatus to obtain the position information (for example, coordinate information of the latitude and longitude) regarding the position as a positioning result.

The GPS receiving section 1 successively obtains the position information regarding the present position of the positioning apparatus for each predetermined time interval set by the operation control section 6 (described in detail below).

Here, the GPS receiving section 1 and the receiving antenna 1a compose a first positioning section which receives a signal transmitted from the positioning satellite and performs positioning of the position of the positioning apparatus.

The triaxial geomagnetic sensor 2 is an autonomous navigation sensor and detects the size of geomagnetism in each direction of three axes orthogonal to each other.

The triaxial geomagnetic sensor 2 outputs the detected signal of each axis to the autonomous navigation control processing section 4.

The triaxial acceleration sensor 3 is an autonomous navigation sensor and detects the acceleration in each direction of three axes orthogonal to each other.

The triaxial acceleration sensor 3 samples the detected signals of each axis at a predetermined frequency and outputs the signal to the autonomous navigation control processing section 4 and the accuracy calculating section 5.

The autonomous navigation control processing section 4 successively performs positioning calculating of autonomous navigation based on data detected by the triaxial geomagnetic sensor 2 and the triaxial acceleration sensor 3.

In other words, the autonomous navigation control processing section 4 obtains data detected by the triaxial geomagnetic sensor 2 and the triaxial acceleration sensor 3 at a predetermined sampling cycle and calculates the movement direction and the movement distance of the positioning apparatus 100 from the detected data.

The autonomous navigation control processing section 4 adds vector data including the calculated movement direction and the movement distance to the position data where the positioning apparatus is previous to obtaining the detected data to calculate the position data which is the positioning result of autonomous navigation.

The autonomous navigation control processing section 4 successively calculates the position data for each predetermined time interval to obtain the displacement of the positioning apparatus.

As described above, the triaxial geomagnetic sensor 2, the triaxial acceleration sensor 3, and the autonomous navigation control processing section 4 compose the second positioning section which detects the movement and the traveling azimuth of the positioning apparatus and performs positioning of the displacement of the positioning apparatus based on the above.

The accuracy calculating section 5 includes the first calculating section 5a which calculates the positioning accuracy of the displacement of the positioning apparatus.

The first calculating section 5a calculates the positioning accuracy of the displacement of the positioning apparatus based on the measured result by the autonomous navigation control processing section 4.

In other words, the first calculating section 5a calculates a stability Ha of the holding state of the positioning apparatus by the user based on the detected result of the detected signal detected by the triaxial acceleration sensor 3 as the positioning accuracy.

Here, the stability Ha of the holding state of the positioning apparatus is represented by a stable state of the positioning apparatus, in other words, a state not rotating around an axis other than a gravity axis as the standard (Ha=1).

Specifically, in a state where the triaxial acceleration sensor 3 of the positioning apparatus is rotating around an axis other than the gravity axis, the normal force component of the acceleration is shown in a frequency component other than 0 Hz of the detected signal of each axis.

In a state where the triaxial acceleration sensor 3 is not rotating around an axis other than the gravity axis, the normal force component is shown in a frequency component of 0 Hz of the detected signal of each axis. Therefore, the opposite direction is to be the gravity axis direction.

The first calculating section 5a applies various low pass filters such as an averaging filter to a detected signal of each axis detected by the triaxial acceleration sensor 3 to extract the frequency component (X0, Y0, Z0) of 0 Hz when specifying the gravity axis direction G (x, y, z) in relation to the triaxial acceleration sensor 3.

The above method of extracting the frequency component of 0 Hz of the detected signal of each axis of the triaxial acceleration sensor 3 illustrates one example and is not limited to the above. Therefore, the method can be suitably modified freely.

The first calculating section 5a calculates the stability Ha of the holding state of the positioning apparatus on the sum of squares of the frequency component (X0, Y0, Z0) of 0 Hz of the detected signal of each axis detected by the triaxial acceleration sensor 3.

The holding state of the positioning apparatus is, for example, a state of holding the apparatus inside a pocket of the user, a state of holding the apparatus in a backpack on the user's back without fixing the apparatus, a state of placing the apparatus in a basket without fixing and freely moving or rotating, and other states.

First, the first calculating section 5a extracts the frequency component (X0, Y0, Z0) of 0 Hz of the detected signal of each axis which is to be the standard in a stationary state where the triaxial acceleration sensor 3 of the positioning apparatus is not rotating around an axis other than the gravity axis.

The first calculating section 5a extracts the frequency component (xa, ya, za) of 0 Hz of the detected signal of each axis of the signal detected by the triaxial acceleration sensor 3 for each predetermined time interval.

Then, according to the formula (1) below, the first calculating section 5a divides the square root of the sum of squares of the frequency component (xa, ya, za) of 0 Hz at a predetermined timing by a square root of the sum of squares of the frequency component (X0, Y0, Z0) of 0 Hz of the detected signal of each axis which is the standard, and calculates the stability Ha (see FIG. 4) of the holding state of the positioning apparatus as the positioning accuracy of the displacement of the positioning apparatus.

[Formula 1]

$$Ha = \frac{\sqrt{(xa^2 + ya^2 + za^2)}}{\sqrt{(X0^2 + Y0^2 + Z0^2)}} \quad (1)$$

As described above, the accuracy calculating section 5 composes the first calculating section which calculates the positioning accuracy of the displacement of the positioning apparatus based on the movement of the positioning apparatus detected by the autonomous navigation control processing section 4.

The operation control section 6 controls the measurement operation by the GPS receiving section 1 and the autonomous navigation control processing section 4.

In other words, the operation control section 6 controls the measurement operation by the GPS receiving section 1 and the autonomous navigation control processing section 4 based on the positioning accuracy (stability Ha of the holding state of the positioning apparatus) calculated by the first calculating section 5a of the accuracy calculating section 5.

Here, the stability Ha of the holding state of the positioning apparatus calculated by the first calculating section 5a in a stationary state where the triaxial acceleration sensor 3 of the positioning apparatus is not rotating around an axis other than the gravity axis is "Ha=1.0".

When the stability Ha is "1.0≥Ha≥0.9", since the error range with respect to the movement distance is about ±5%, the operation control section 6 specifies that the positioning apparatus is in a stable state substantially the same as a stationary state held in a predetermined position.

When the stability Ha is "0.9>Ha≥0.8", since the error range with respect to the movement distance is about ±20%, the operation control section 6 specifies that the positioning apparatus is in an unstable state which is not stationary.

When the stability Ha is "Ha<0.8", the error range is large and therefore, the operation control section 6 specifies that the positioning apparatus is in a state where measurement cannot be performed.

When the stability Ha is "Ha>1.0", it is assumed that the positioning apparatus is in a state where acceleration in the gravity axis direction is applied artificially.

Figure 4:
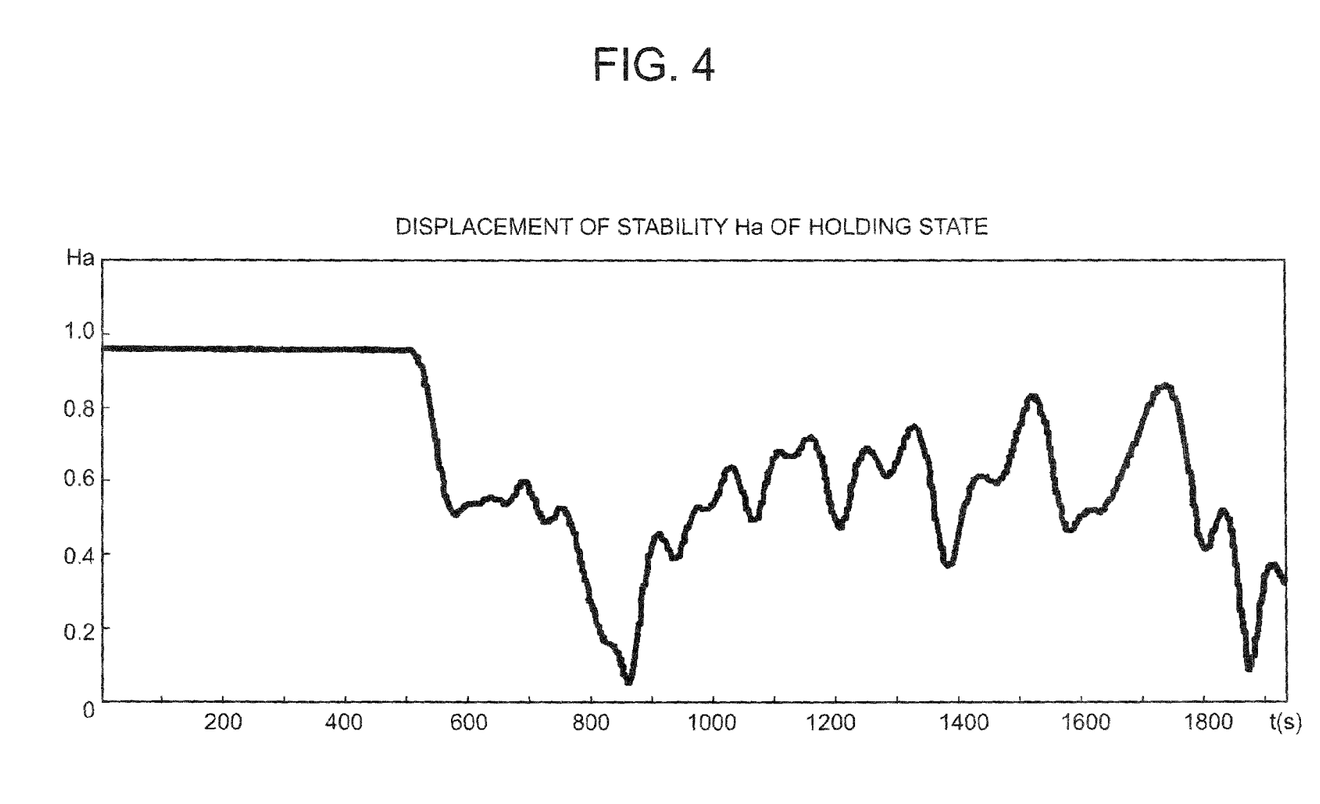
FIG. 4 is a diagram schematically showing displacement of stability of a holding state of the positioning apparatus shown in FIG. 1.

In an example of "stability Ha of the holding state of the positioning apparatus" shown in FIG. 4, for example, until about 500 seconds (s), the stability Ha is "Ha=1.0" and the holding state is in a stable state. However, afterwards, the value of the stability Ha is in a largely changed state.

Then, the operation control section 6 controls the measurement operation by the GPS receiving section 1 and the autonomous navigation control processing section 4 according to the judgment result of the stability Ha of the holding state of the positioning apparatus.

Specifically, the operation control section 6 changes the interval of measuring the position of the positioning apparatus by the GPS receiving section 1 according to the judgment result of the stability Ha.

For example, when the stability Ha is "1.0≥Ha≥0.9", the operation control section 6 sets the interval of measuring the position information by the GPS receiving section 1 to a predetermined time A (for example, 10 minutes, etc.).

When the stability Ha is "0.9>Ha≥0.8", the operation control section 6 sets the interval of measuring by the GPS receiving section 1 to a predetermined time A/4 (for example, 2.5 minutes, etc.).

When the stability Ha is "Ha<0.8", the operation control section 6 sets the interval of measuring by the GPS receiving section 1 to each minute.

Here, the interval of measuring the position of the positioning apparatus by the GPS receiving section 1 is timed by a timer not shown. The timer can be included in the operation control section 6 or can be included in a section other than the operation control section 6 such as the central control section 12.

The operation control section 6 can control the measurement operation by the autonomous navigation control processing section 4, such as the time interval for calculating position data which is the positioning result of the autonomous navigation, based on the positioning accuracy (stability Ha of the holding state of the positioning apparatus) calculated by the first calculating section 5a of the accuracy calculating section 5.

As described above, the operation control section 6 composes a control section which controls the measurement operation of the GPS receiving section 1 and the autonomous navigation control processing section 4 based on the positioning accuracy (stability Ha) calculated by the first calculating section 5a of the accuracy calculating section 5a.

The present position specifying section 7 specifies the present position of the positioning apparatus.

In other words, the present position specifying section 7 specifies the present position of the positioning apparatus based on the measured result by the GPS receiving section 1 and the autonomous navigation control processing section 4.

Specifically, the present position specifying section 7 changes the measured result used in specifying the present position of the positioning apparatus among the measured results of the GPS receiving section 1 and the autonomous navigation control processing section 4 according to whether or not the stability Ha of the holding state of the positioning apparatus calculated by the accuracy calculating section 5 is a predetermined value (for example, 0.9) or more.

For example, when it is judged that the stability Ha is "Ha≥0.9", the present position specifying section 7 specifies the present position of the positioning apparatus using the measured result by the autonomous navigation control processing section 4.

When it is judged that the stability Ha is not "Ha≥0.9" (in other words, it is "Ha<0.9"), the present position specifying section 7 uses the measured result by the GPS receiving section 1 to specify the present position of the positioning apparatus.

The present position specifying section 7 sequentially specifies the present position of the positioning apparatus to sequentially generate a string of position data showing a route of movement by the user and stores the data in the predetermined storage section (for example, program memory 11, etc.).

As described above, the present position specifying section 7 composes a specifying section which specifies the present position of the positioning apparatus based on the measured result by the measurement operation of the GPS receiving section 1 and the autonomous navigation control processing section 4 controlled by the operation control section 6.

The operation input section 8 receives input of various instructions on the positioning apparatus based on predetermined operation by the user.

Specifically, the operation input section 8 includes, for example, a power source button, up, down, left, and right cursor buttons, enter button, and the like (all not illustrated).

The display section 9 is, for example a liquid crystal display panel and reads out image data for display of various pieces of information, images and the like temporarily stored in the working memory 10 to display the image data on the display screen.

The working memory 10 includes a DRAM (Dynamic Random Access Memory), and the like and temporarily stores data, etc. processed by the central control section 12, etc.

The program memory 11 stores various programs and various pieces of data necessary for operation of the CPU of the central control section 12.

The central control section 12 centrally controls each section of the positioning apparatus 100.

Specifically, although illustration is omitted, the central control section 12 includes a CPU (Central Processing Unit) and performs various control operation according to various processing programs for the positioning apparatus 100 and displays the result of the control operation as necessary on the display section 9.

Next, the positioning processing by the positioning apparatus 100 is described with reference to FIG. 2 to FIG. 4.

Figure 2:
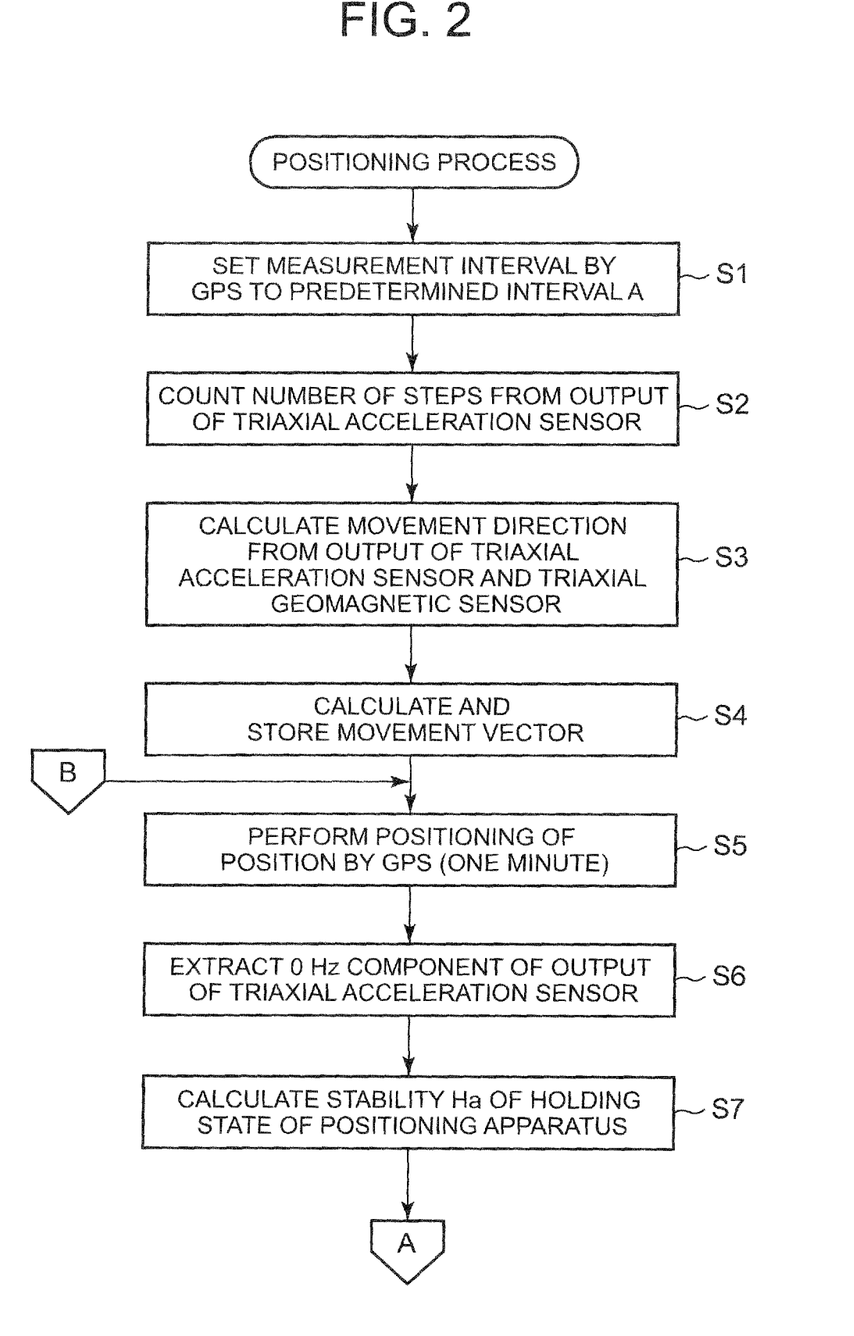
FIG. 2 is a flowchart showing an example of operation regarding positioning processing by the positioning apparatus shown in FIG. 1.
Figure 3:
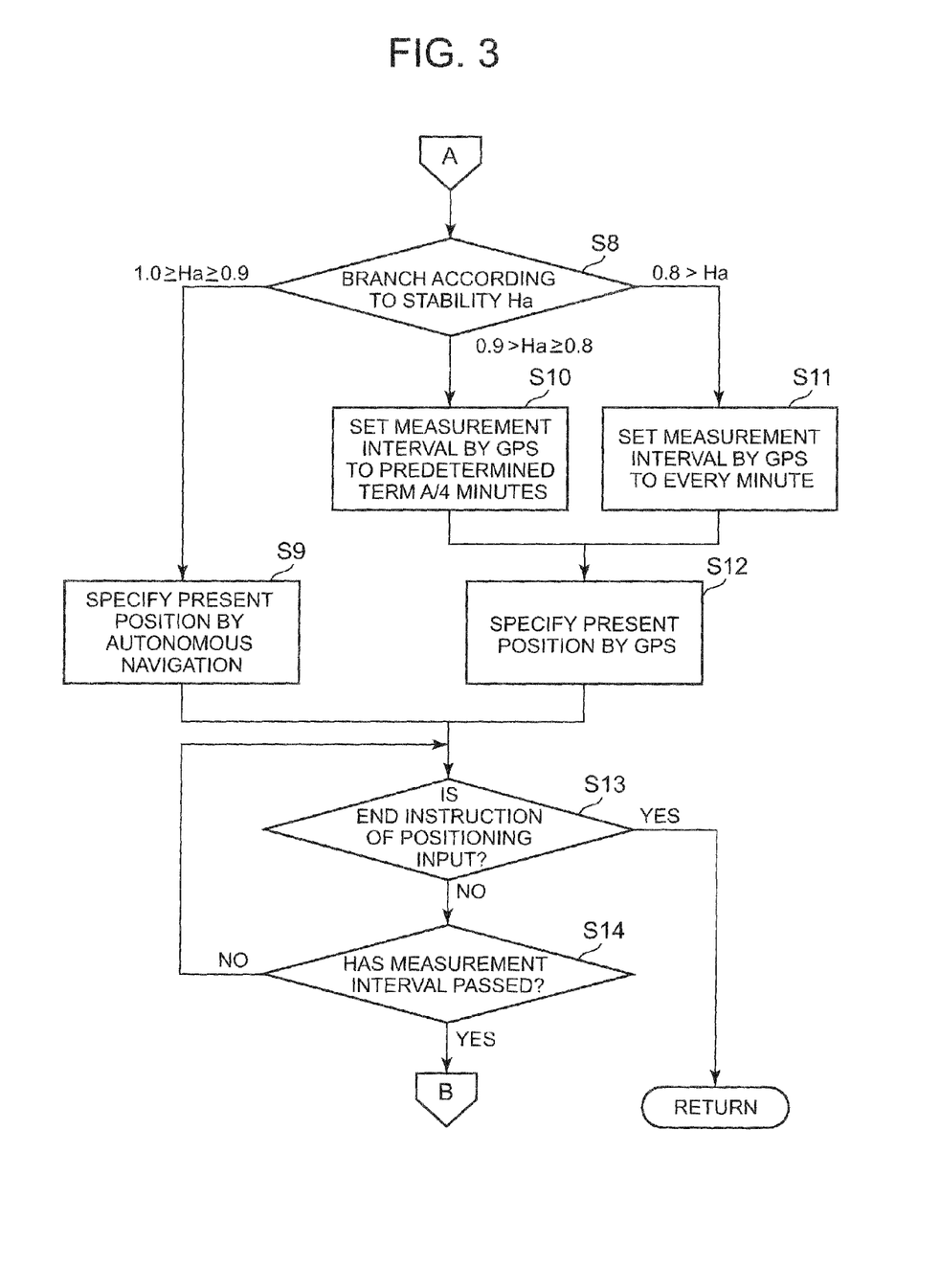
FIG. 3 is a flowchart showing an example of operation regarding continuation of the positioning processing shown in FIG. 2.

FIG. 2 and FIG. 3 are flowcharts showing an example of operation regarding the positioning processing.

In the positioning processing below, the frequency component (X0, Y0, Z0) of 0 Hz of the detected signal of each axis which is to be the standard when the triaxial acceleration sensor 3 of the positioning apparatus is in a stationary state not rotating around an axis other than the gravity axis is extracted and stored in the predetermined storage section (for example, a working memory 10, etc.) in advance.

As shown in FIG. 2, first, the operation control, section 6 sets (timer setting) a measuring term by the GPS receiving section 1 to a predetermined term (for example, 10 minutes, etc.) in order to intermittently perform GPS positioning which obtains position information regarding the present position (latitude, longitude) of the positioning apparatus by the GPS receiving section 1 (step S1).

Then, the operation control section 6 starts keeping time with the timer after setting the measurement interval.

Next, the autonomous navigation control processing section 4 successively performs the positioning calculation of the autonomous navigation for each predetermined time interval based on the data detected by the triaxial geomagnetic sensor 2 and the triaxial acceleration sensor 3 (step S2 to S4).

Specifically, the autonomous navigation control processing section 4 obtains the data detected by the triaxial geomagnetic sensor 2 and the triaxial acceleration sensor 3 at a predetermined sampling cycle and counts the number of steps based on the data detected by the triaxial acceleration sensor 3 (step S2). The autonomous navigation control processing section 4 calculates the azimuth of the movement direction based on the detected data of the triaxial geomagnetic sensor 2 and the triaxial acceleration sensor 3 (step S3).

Next, after calculating the movement distance from the number of steps and stride length data, the autonomous navigation control processing section 4 calculates the movement vector from the movement distance and the azimuth of the movement direction and stores the result in the working memory 10 (step S4).

Then, the GPS receiving section 1 performs positioning of the present position of the positioning apparatus for one minute based on the input of the positioning instruction by the GPS output from the operation control section 6 (step S5).

Next, after the frequency component (xa, ya, za) of 0 Hz of the detected signal of each axis of the signal detected by the triaxial acceleration sensor 3 is extracted (step S6), the first calculating section 5a of the accuracy calculating section 5 calculates the stability Ha (see FIG. 4) of the holding state of the positioning apparatus (step S7).

Specifically, according to the formula (I) below, the first calculating section 5a divides the square root of the sum of squares of the frequency component (xa, ya, za) of 0 Hz which is extracted at a predetermined timing by a square root of the sum of squares of the frequency component (X0, Y0, Z0) of 0 Hz of the detected signal of each axis which is the standard, and calculates the stability Ha of the holding state of the positioning apparatus.

[Formula 2]

$$Ha = \frac{\sqrt{(xa^2 + ya^2 + za^2)}}{\sqrt{(X0^2 + Y0^2 + Z0^2)}} \qquad (1)$$

As shown in FIG. 3, the operation control section 6 branches the processing according to the stability Ha of the holding state of the positioning apparatus calculated by the first calculating section 5a (step S8).

Specifically, when the stability Ha is "$1.0 \geq Ha \geq 0.9$", the operation control section 6 maintains the state where the measurement interval of the position information regarding the present position by the GPS receiving section 1 is set to a predetermined time A (for example, 10 minutes, etc.). Then, since the stability Ha is "$Ha \geq 0.9$", the present position specifying section 7 uses the measured result (autonomous navigation positioning) by the autonomous navigation control processing section 4 to specify the present position of the positioning apparatus (step S9).

When the stability Ha is "$0.9 > Ha \geq 0.8$", the operation control section 6 sets the measurement interval by the GPS receiving section 1 to a predetermined time A/4 (for example, 2.5 minutes, etc.) (step S10).

When the stability Ha is "$Ha < 0.8$", the operation control section 6 sets the measurement interval by the GPS receiving section 1 to every minute (step S11).

Then, since the stability Ha is not "$Ha \geq 0.9$", the present position specifying section 7 specifies the present position of the positioning apparatus using the measured result (GPS positioning) by the GPS receiving section 1 (step S12).

Next, the operation control section 6 judges whether or not the end instruction of the positioning processing is input from the CPU of the central control section 12 based on the predetermined operation of the operation input section 8 by the user (step S13).

Here, when it is judged that the end instruction of the positioning processing is not input (step S13; NO), the operation control section 6 judges whether or not the measurement interval of the GPS positioning by the GPS receiving section 1 has passed based on the result of the time kept by the timer (step S14).

In step S14, when it is judged that the measurement interval of the GPS positioning has not passed (step S14; NO), the operation control section 6 returns the processing to step S13 and controls the processing to follow.

In step S14, when it is judged that the measurement interval of the GPS positioning has passed (step S14; YES), the operation control section 6 returns the processing to step S5 and outputs the positioning instruction by the GPS to the GPS receiving section 1.

The GPS receiving section 1 performs the positioning of the present position of the positioning apparatus for one minute based on the input of the positioning instruction (step S5).

In step S13, when it is judged that the end instruction of the positioning processing is input from the CPU of the central control section 12 (step S13; YES), the operation control section 6 ends the positioning processing employing both the GPS positioning and the autonomous navigation positioning.

As described above, according to the positioning apparatus 100 of the present embodiment, the operation control section 6 controls the measurement operation of the GPS receiving section 1 and the autonomous navigation control processing section 4 based on the positioning accuracy of displacement of the positioning apparatus by the autonomous navigation control processing section 4.

With this, the operation control section 6 can efficiently control the measurement operation of the GPS receiving section 1 and the autonomous navigation control processing 4 corresponded with the holding state of the positioning apparatus by the user, when the measured result by the autonomous navigation control processing section 4 is used effectively in order to suppress consumed power for measurement operation by the GPS receiving section 1.

The present position specifying section 7 specifies the present position of the positioning apparatus based on the measured result by the GPS receiving section 1 and the autonomous navigation control processing section 4.

With this, by using the measured result by the autonomous navigation control processing section 4, the present position specifying section 7 can accurately perform specification of the present position of the positioning apparatus while suitably suppressing the consumed power for measurement operation by the GPS receiving section 1.

Specifically, the operation control section 6 changes the measurement interval of the position of the positioning apparatus by the GPS receiving section 1 based on the positioning accuracy of displacement of the positioning apparatus by the autonomous navigation control processing section 4.

As a result, for example, when the holding state of the positioning apparatus is a stable state and the positioning accuracy of the displacement of the positioning apparatus by the autonomous navigation control processing section 4 is high enough, the operation control section 6 can actively use the measured result by the autonomous navigation control processing section 4.

With this, the operation control section 6 can reduce the number of measurement operation by the GPS receiving section 1 for each unit of time and the consumed power for measurement operation by the GPS receiving section 1 can be efficiently suppressed.

When the holding state of the positioning apparatus is in an unstable state and the positioning accuracy of the displacement of the positioning apparatus by the autonomous navigation control processing section 4 decreases, the movement direction is not clear from the autonomous navigation positioning. Therefore, the operation control section 6 can increase the number of measurement operation by the GPS receiving section 1 for each unit of time and the measured result by the GPS receiving section 1 can be actively used.

With this, the present position specifying section 7 can accurately perform the specification of the present position of the positioning apparatus.

With this, the operation control section 6 can employ different positioning methods while preventing reduction of accuracy of specifying the present position.

The accuracy calculating section 5 calculates the stability of the holding state of the positioning apparatus by the user as the positioning accuracy of displacement of the positioning apparatus based on the sum of squares of the frequency component of 0 Hz among the detected signal of each axis detected by the triaxial acceleration sensor 3.

As a result, the accuracy calculating section 5 can suitably perform calculation of the positioning accuracy of the displacement of the positioning apparatus using the stability of the holding state of the positioning apparatus. Therefore, the specification of the present position of the positioning apparatus can be accurately performed while suitably suppressing the consumed power for the measurement operation by the GPS receiving section 1.

The present invention is not limited to the above embodiments, and various modifications and change in design can be performed without leaving the scope of the present invention.

Below, a modification example of the positioning apparatus 100 is described.

<Modification 1>

Figure 5:
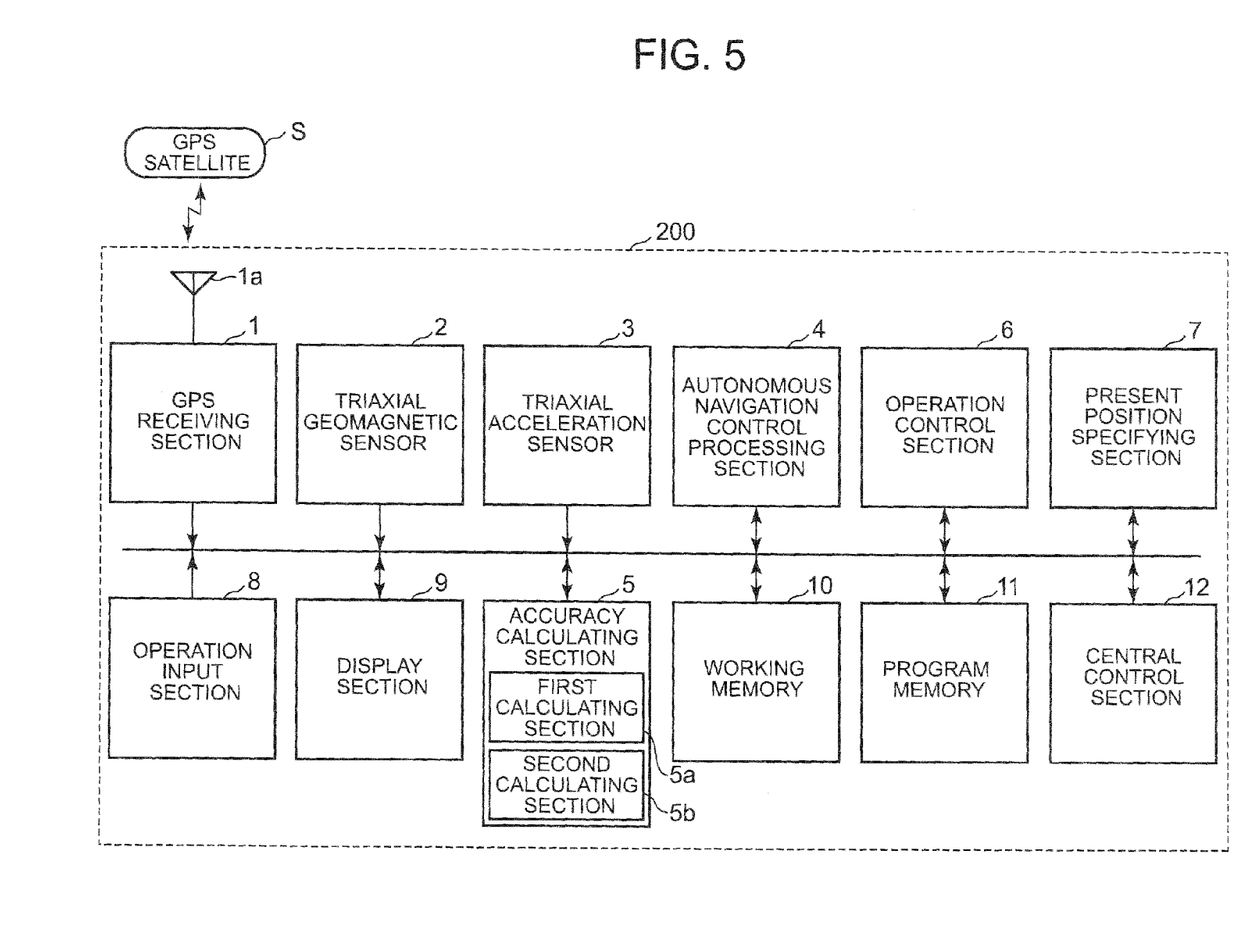
FIG. 5 is a block diagram showing a schematic configuration of a positioning apparatus of modification 1.

FIG. 5 is a block diagram showing a schematic configuration of the positioning apparatus 200 of the modification 1.

The positioning apparatus 200 of the modification 1 specifies the present position of the positioning apparatus based on the positioning accuracy of the displacement of the positioning apparatus calculated by the first calculating section 5a and the positioning accuracy of the position of the positioning apparatus calculated by the second calculating section 5b.

With the exception of the points described in detail below, the positioning apparatus 200 of the modification 1 includes a substantially similar configuration to that of the positioning apparatus 100 of the above embodiment and therefore the detailed description is omitted.

As shown in FIG. 5, the accuracy calculating section 5 of the positioning apparatus 200 includes a second calculating section 5b in addition to a first calculating section 5a.

The second calculating section 5b calculates the positioning accuracy of the position of the positioning apparatus based on the measured result by the GPS receiving section 1.

In other words, the second calculating section 5b calculates the positioning accuracy of the position of the positioning apparatus based on at least one of a GST (GNSS Pseudorange Error Statistics) value, a C/N (Carrier/Noise) value, a DOP (Dilution of Precision) value or an EPE (Estimated Position Error) value based on the GPS signal received through the receiving antenna 1a by the GPS receiving section GPS receiving section 1.

Here, the second calculating section 5b composes the second calculating section which calculates the positioning accuracy of the position of the positioning apparatus based on the measured result by the GPS receiving section 1.

Then, the present position specifying section 7 specifies the present position of the positioning apparatus based on the positioning accuracy (stability Ha) of the displacement of the positioning apparatus calculated by the first calculating section 5a and the positioning accuracy of the position of the positioning apparatus calculated by the second calculating section 5b.

Specifically, the present position specifying section 7 calculates first accuracy information which normalizes the positioning accuracy (stability Ha of the holding state of the positioning apparatus) of the displacement of the positioning apparatus calculated by the first calculating section 5a based on a predetermined arithmetic expression.

The present position specifying section 7 calculates second accuracy information which normalizes the positioning accuracy of the position of the positioning apparatus calculated by the second calculating section 5b based on the predetermined arithmetic expression.

Then, the present position specifying section 7 compares the first accuracy information with the second accuracy information, and changes the measured result used to specify the present position of the positioning apparatus among the measured result of the GPS receiving section 1 and the autonomous navigation control processing section 4 according to the result.

In other words, when the present position specifying section 7 judges that the first accuracy information is higher than the second accuracy information, the present position specifying section 7 uses the measured result by the autonomous navigation control processing section 4 to specify the present position of the positioning apparatus.

When the present position specifying section 7 judges that the first accuracy information is not higher than the second accuracy information, the present position specifying section 7 uses the measured result by the GPS receiving section 1 to specify the present position of the positioning apparatus.

The above judging processing by the present position specifying section 7 is performed when the stability Ha is "0.9>Ha≥0.8". However, this is one example, and the processing is not limited to the above.

Next, the positioning processing by the positioning apparatus 200 of the modification 1 is described with reference to FIG. 2 and FIG. 6.

Figure 6:
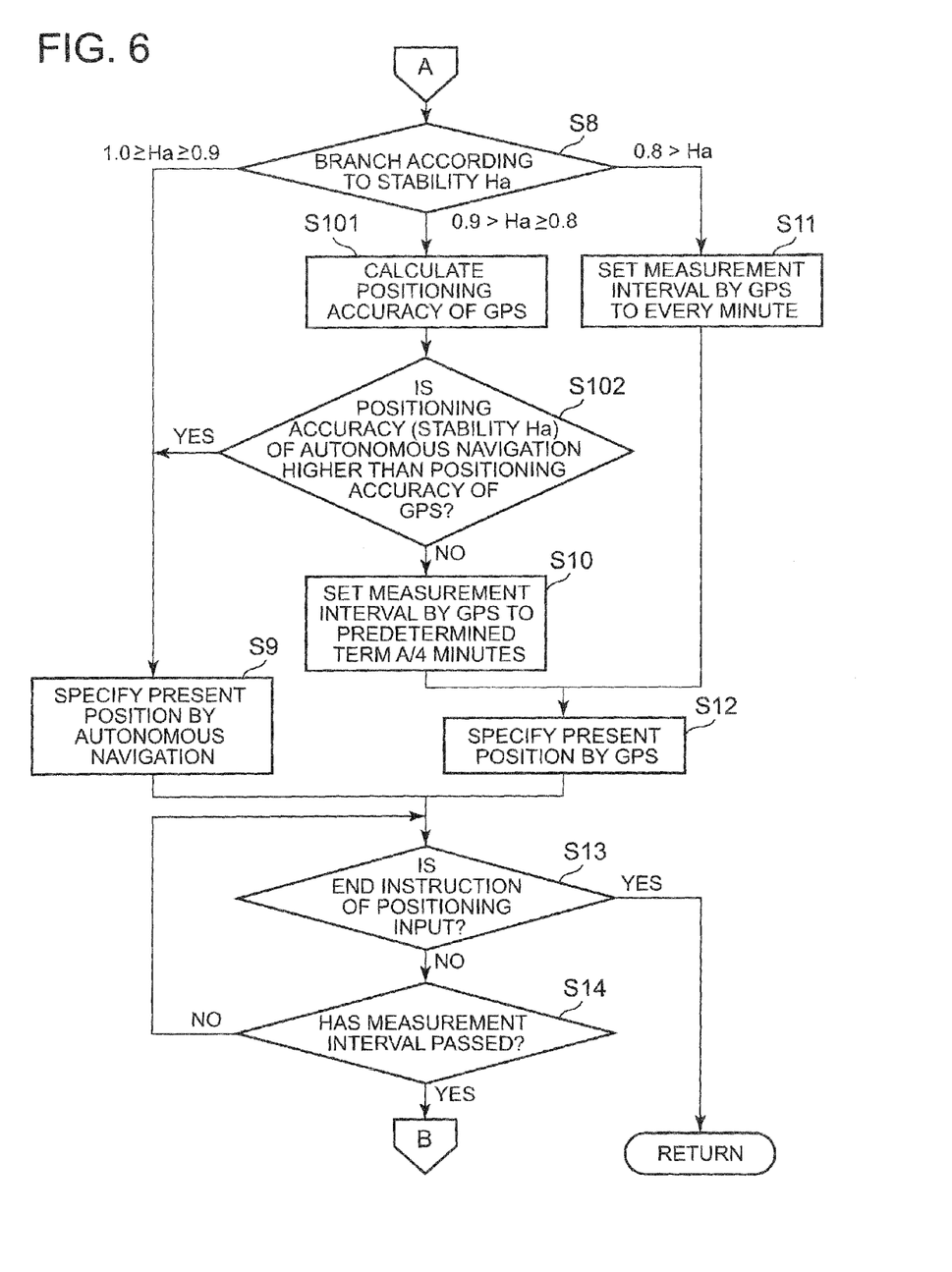
FIG. 6 is a flowchart showing an example of operation regarding the positioning processing by the positioning apparatus shown in FIG. 5.

FIG. 6 is a flowchart showing an example of the operation of the positioning processing.

Each processing of the positioning processing shown in FIG. 6 is processing performed after each processing of steps S1 to S7 of the positioning processing shown in FIG. 2.

Each processing of steps S1 to S7 of the positioning processing shown in FIG. 2 is similar to the positioning processing of the present embodiment, and the detailed description is omitted.

In other words, in step S7, after calculating the stability Ha (see FIG. 4) of the holding state of the positioning apparatus by the first calculating section 5a (step S7), as shown in FIG. 6, similar to the positioning processing of the above embodiment, the operation control section 6 branches the processing according to the stability Ha of the holding state of the positioning apparatus calculated by the first calculating section 5a (step S8).

Specifically, similar to the positioning processing of the above embodiment, when the stability Ha is "1.0≥Ha≥0.9", the operation control section 6 maintains the state where the measurement interval of the position information regarding the present position by the GPS receiving section 1 is set to a predetermined time A (for example, 10 minutes, etc.).

Then, since the stability Ha is "Ha≥0.9", the present position specifying section 7 uses the measured result (autonomous navigation positioning) by the autonomous navigation control processing section 4 to specify the present position of the positioning apparatus (step S9).

Similar to the positioning processing of the above embodiment, when the stability Ha is "Ha<0.8", the operation control section 6 sets the measurement interval by the GPS receiving section 1 to each minute (step S11).

Then, the present position specifying section 7 uses the measured result (GPS positioning) by the GPS receiving section 1 to specify the present position of the positioning apparatus (step S12).

When the stability Ha is "0.9>Ha≥0.8", the second calculating section 5b of the accuracy calculating section 5 calculates the positioning accuracy of the position of the positioning apparatus based on the measured result by the GPS receiving section 1 (step S101).

Specifically, the second calculating section 5b calculates the positioning accuracy of the position of the positioning apparatus based on at least one of the GST value, the C/N value, the DOP value or the EPE value according to the GPS signal received through the receiving antenna 1a by the GPS receiving section 1.

Next, the present position specifying section 7 judges whether or not the positioning accuracy of the autonomous navigation is higher than the positioning accuracy of the GPS (step S102).

Specifically, the present position specifying section 7 calculates the first accuracy information which normalizes the stability Ha of the holding state of the positioning apparatus calculated by the first calculating section 5a based on the predetermined arithmetic expression.

Then, the present position specifying section 7 calculates the second accuracy information which normalizes the positioning accuracy of the position of the positioning apparatus calculated by the second calculating section 5b based on the predetermined arithmetic expression.

Then, the present position specifying section 7 compares the first accuracy information with the second accuracy information and judges whether or not the positioning accuracy of the autonomous navigation is higher than the positioning accuracy of the GPS.

In step S102, when it is judged that the positioning accuracy of the autonomous navigation is not higher than the positioning accuracy of the GPS (step S102; NO), the operation control section 6 sets the measurement interval by the GPS receiving section 1 to a predetermined time A/4 (for example, 2.5 minutes, etc.) similar to the positioning processing of the above embodiment (step S10).

Then, the processing advances to step S12, and similar to the positioning processing of the above embodiment, the present position specifying section 7 uses the measured result (GPS positioning) by the GPS receiving section 1 to specify the present position of the positioning apparatus (step S12).

In step S102, when it is judged that the positioning accuracy of the autonomous navigation is higher than the positioning accuracy of the GPS (step S102; YES), the processing advances to step S9.

Then, the present position specifying section 7 uses the measured result (autonomous navigation positioning) by the autonomous navigation control processing section 4 to specify the present position of the positioning apparatus (step S9).

In other words, although the stability Ha is not "Ha≥0.9", it is assumed that the positioning accuracy of the autonomous navigation is relatively high, and therefore the present position specifying section 7 uses the autonomous navigation positioning to specify the present position of the positioning apparatus.

Then, the CPU of the central control section 12 advances the processing to step S13 and similar to the positioning processing of the above embodiment, controls the processing which follows.

Therefore, according to the positioning apparatus 200 of the modification 1, the present position specifying section 7 can judge which of the measured results by the GPS receiving section 1 and the autonomous navigation control processing section 4 to use when specifying the present position of the positioning apparatus by using the positioning accuracy (stability Ha) of displacement of the positioning apparatus calculated by the first calculating section 5a and the positioning accuracy of the position of the positioning apparatus calculated by the second calculating section 5b.

For example, when the holding state of the positioning apparatus is not in a stable state but the positioning accuracy of the displacement of the positioning apparatus by the autonomous navigation control processing section 4 is relatively high, the present position specifying section 7 can reduce the number of times of measurement operation by the GPS receiving section 1 for each unit of time by actively using the measured result by the autonomous navigation control processing section 4, and the consumed power for the measurement operation by the GPS receiving section 1 can be efficiently suppressed.

With this, the present position specifying section 7 can accurately perform specification of the present position of the positioning apparatus while suitably suppressing the consumed power for the measurement operation by the GPS receiving section 1.

Moreover, since the second calculating section 5b calculates the positioning accuracy of the position of the positioning apparatus based on at least one of the GST value, the C/N value, the DOP value or the EPE value, the second calculating section 5b can suitably perform calculation of the positioning accuracy of the position of the positioning apparatus using at least one of the GST value, the C/N value, the DOP value or the EPE value.

In the modification 1, the processing of calculating the positioning accuracy of the position of the positioning apparatus (step S101) and judging whether or not the positioning accuracy of the autonomous navigation is higher than the positioning accuracy of the GPS (step S102) are performed before setting the measurement interval by the GPS receiving section 1 to a predetermined time A/4. However, the timing of executing the above processing is one example and is not limited to the above. The above timing can be suitably changed and can be performed after setting the measurement interval by the GPS receiving section 1 to a predetermined time A/4.

In the modification 1, when the stability Ha of the holding state of the positioning apparatus is "$0.9<Ha\geq0.8$", the first accuracy information is compared with the second accuracy information to judge whether or not the positioning accuracy of the autonomous navigation is higher than the positioning accuracy of the GPS. However, regardless of the value of stability Ha, the first accuracy information can be compared with the second accuracy information and which of the measured result by the GPS receiving section 1 and the autonomous navigation control processing section 4 is used to specify the present position of the positioning apparatus can be judged based on the judgment result.

The configuration of the positioning apparatuses 100 and 200 illustrated in the above embodiments are one example and the configuration is not limited to the above.

In addition, according to the present embodiment, the functions as the first positioning section, the second positioning section, the first calculating section, the control section and the specifying section are realized by driving the GPS receiving section 1, the autonomous navigation control processing section 4, the first calculating section 5a, the operation control section 6 and the present position specifying section 7 under the control of the central control section 12.

However, the configuration is not limited to the above, and the above functions can be realized by predetermined programs executed by the central control section 12.

In other words, a program including a first positioning processing routine, a second positioning processing routine, a first calculating processing routine, a control processing routine and a specifying processing routine is stored in a program memory (not illustrated) for storing programs.

Then, according to the first positioning processing routine, the CPU of the central control section 12 can function as the first positioning section which receives the signal transmitted from the positioning satellite to perform positioning of the position of the positioning apparatus.

According to the second positioning processing routine, the CPU of the central control section 12 can function as the second positioning section which detects the movement and the traveling azimuth of the positioning apparatus and performs positioning of the displacement of the positioning apparatus based on the detected result.

According to the first calculating processing routine, the CPU of the central control section 12 can function as the first calculating section which calculates the positioning accuracy of the displacement of the positioning apparatus based on the movement of the positioning apparatus detected by the second positioning section.

According to the control processing routine, the CPU of the central control section 12 can function as the control section which controls the measurement operation of the first positioning section and the second positioning section based on the positioning accuracy calculated by the first calculating section.

According to the specifying processing routine, the CPU of the central control section 12 can function as the specifying section which specifies the present position of the positioning apparatus based on the measured result by the first positioning section and the second positioning section where the measurement operation is controlled by the control section.

Similarly, the second calculating section can be realized by a predetermined program executed by the CPU of the central control section 12.

As a computer readable storage medium which stores the program for performing the above processing, other than a ROM, a hard disk, etc., a nonvolatile memory such as a flash memory, etc., a portable recording medium such as a CD-ROM, etc. can be applied.

As a medium which provides data of a program through predetermined communication lines, a carrier wave can be applied.

The entire disclosure of Japanese Patent Application No. 2011-215935 filed on Sep. 30, 2011 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A positioning apparatus comprising:
    a first positioning section which receives a signal transmitted from a positioning satellite and performs positioning of a position of an positioning apparatus;
    a second positioning section which detects a movement and traveling azimuth of the positioning apparatus and performs positioning of displacement of the positioning apparatus based on the detected result;
    a first calculating section which calculates a positioning accuracy of displacement of the positioning apparatus based on the movement detected by the second positioning section;
    a control section which controls a measurement operation of the first positioning section and the second, positioning section based on the positioning accuracy calculated by the first calculating section; and
    a specifying section which specifies a present position of the positioning apparatus based on a measured result by the measurement operation of the first positioning section and the second positioning section controlled by the control section.

2. The positioning apparatus according to claim 1, wherein, the second positioning section further includes a triaxial acceleration sensor which detects acceleration in each direction of three axes orthogonal to each other; and
    the first calculating section calculates stability of a holding state of the positioning apparatus by the user as the positioning accuracy based on the detected result by the triaxial acceleration sensor.

3. The positioning apparatus according to claim 2, wherein, the first calculating section further calculates the stability of the holding state of the positioning apparatus based on a sum of squares of a frequency component of 0 Hz among the detected signal of each axis detected by the triaxial acceleration sensor.

4. The positioning apparatus according to claim 1, wherein, the control section further changes a measurement interval of the position of the positioning apparatus by the first positioning section based on the positioning accuracy calculated by the first calculating section.

5. The positioning apparatus according to claim 1, further comprising:
    a second calculating section which calculates a positioning accuracy of a position of the positioning apparatus based on the positioning result by the first positioning section,
    wherein the specifying section specifies the present position of the positioning apparatus based on the positioning accuracy calculated by the first calculating section and the positioning accuracy calculated by the second calculating section.

6. The positioning apparatus according to claim 5 wherein, the second calculating section calculates the positioning accuracy of the position of the positioning apparatus based on at least one of a GST value, a C/N value, a DOP value or an EPE value.

7. A positioning method using a positioning apparatus comprising the steps of:
    a first positioning process which receives a signal transmitted from a positioning satellite and performs positioning of a position of the positioning apparatus;
    a second positioning process which detects a movement and traveling azimuth of the positioning apparatus and performs positioning of displacement of the positioning apparatus based, on the detected result;
    a first calculating process which calculates a positioning accuracy of displacement of the positioning apparatus based on the movement detected by the second positioning process;
    a control process which controls a measurement operation of the first positioning process and the second positioning process based on the positioning accuracy calculated by the first calculating process; and
    a specifying process which specifies a present position of the positioning apparatus based on a measured result by the measurement operation of the first positioning process and the second positioning process controlled by the control process.

8. A non-transitory computer-readable storage medium having a program stored thereon for controlling a computer of the positioning apparatus to function as:
    a first positioning section which receives a signal transmitted from a positioning satellite and performs positioning of a position of the positioning apparatus;
    a second positioning section which detects a movement and traveling azimuth of the positioning apparatus and performs positioning of displacement of the positioning apparatus based on the detected result;
    a first calculating section which calculates a positioning accuracy of displacement of the positioning apparatus based on the movement detected by the second positioning section;
    a control section which controls a measurement operation of the first positioning section and the second positioning section based on the positioning accuracy calculated by the first calculating section; and
    a specifying section which specifies a present position of the positioning apparatus based on a measured result by the measurement operation of the first positioning section and the second positioning section controlled by the control section.

* * * * *

UNITED STATES PATENT AND TRADEMARK OFFICE
CERTIFICATE OF CORRECTION

| | | |
|---|---|---|
| PATENT NO. | : 9,019,156 B2 | |
| APPLICATION NO. | : 13/615363 | |
| DATED | : April 28, 2015 | |
| INVENTOR(S) | : Kouhei Watanabe | |

It is certified that error appears in the above-identified patent and that said Letters Patent is hereby corrected as shown below:

In the claims

Column 15, claim 1, line 14, change "second," to --second--.

Column 16, claim 7, line 9, change "based," to --based--.

Signed and Sealed this
Seventeenth Day of November, 2015

Michelle K. Lee
*Director of the United States Patent and Trademark Office*